Aug. 23, 1960     S. F. CLARK ET AL     2,950,151
COMBINED CAGE AND RETAINER FOR BEARING ROLLERS
Filed March 19, 1956     2 Sheets-Sheet 1
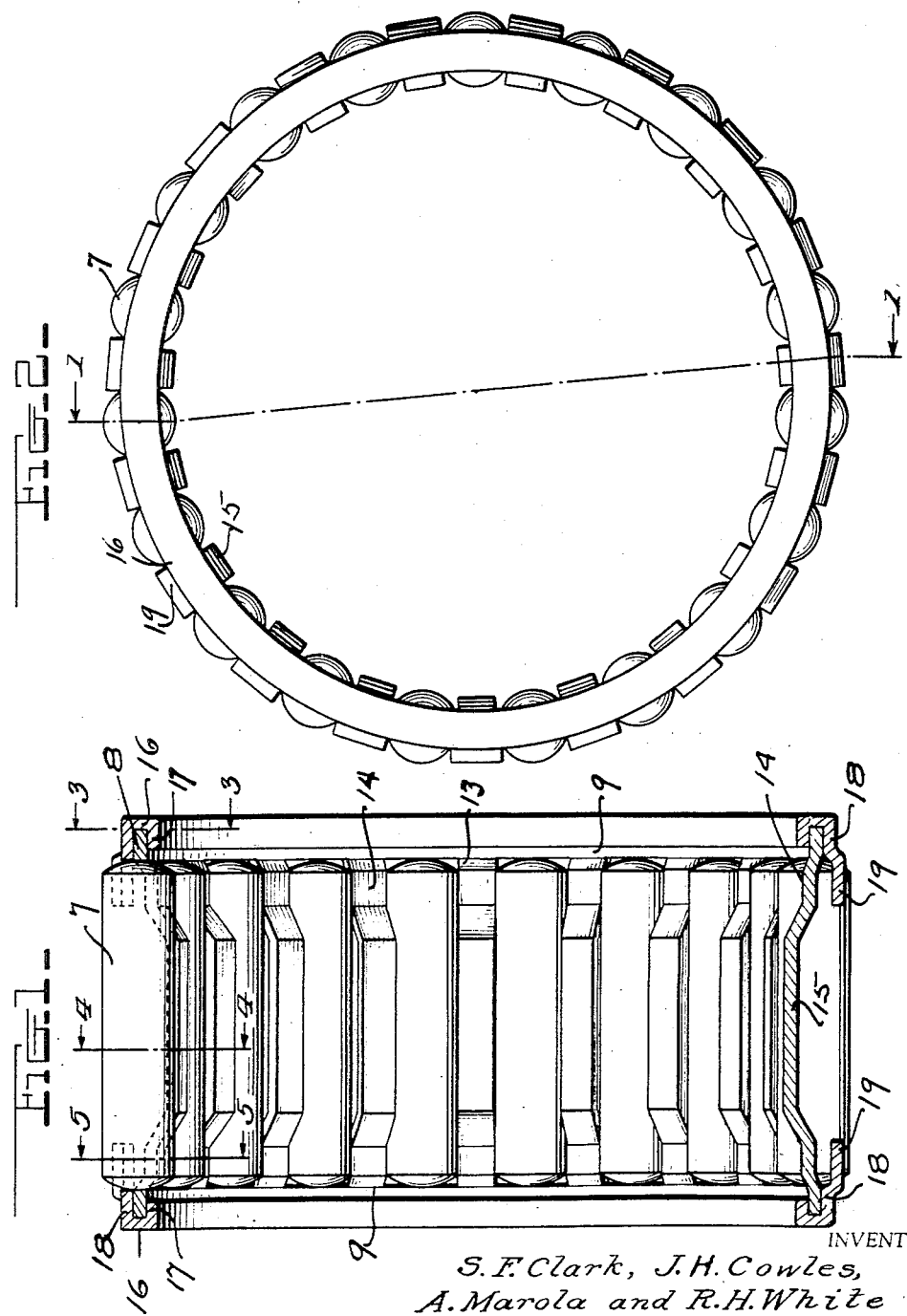
INVENTORS
S. F. Clark, J. H. Cowles,
A. Marola and R. H. White
BY *Mason, Porter, Miller & Stewart*
ATTORNEYS

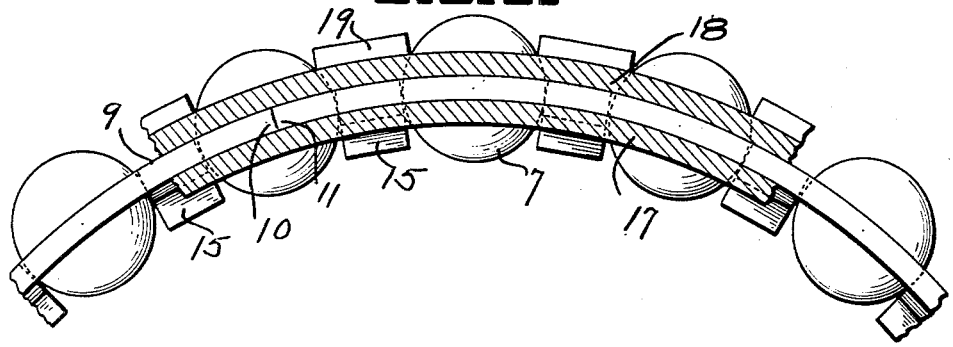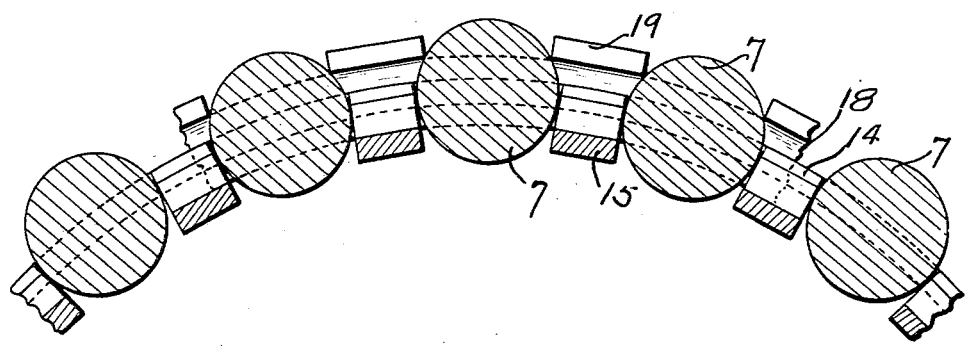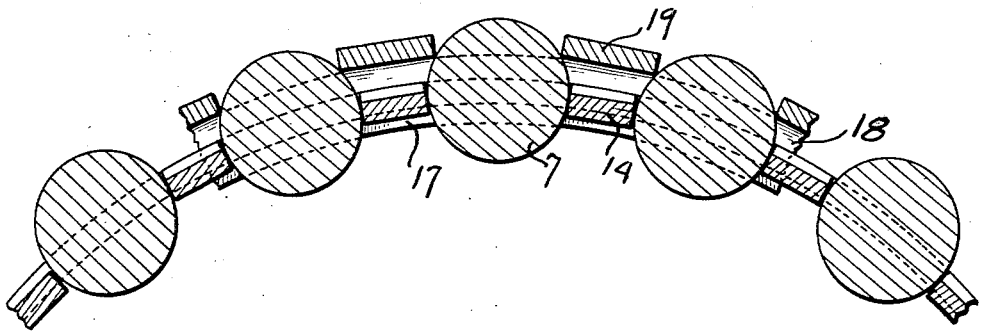

United States Patent Office 2,950,151
Patented Aug. 23, 1960

2,950,151

COMBINED CAGE AND RETAINER FOR BEARING ROLLERS

Sidney F. Clark, Torrington, John H. Cowles, Forestville, and Americo Marola and Robert H. White, Torrington, Conn., assignors to The Torrington Company, Torrington, Conn., a corporation of Maine Filed Mar. 19, 1956, Ser. No. 572,544

4 Claims. (Cl. 308—217)

The invention of which the following is a detailed specification relates to a combined cage and retainer for bearing rollers. The cage is required for holding bearing rollers in parallel spaced relationship and must also provide means to prevent their dislodgment. This dislodgment would occur radially in both inward and outward directions. Unless confined by the surrounding raceway or the inner journal or raceway, individual rollers are apt to fall out of place very easily.

The present invention is addressed to an improved cage which will include means preventing the dislodgment of the individual rollers regardless of whether the assembly is installed in operating position or separate.

Generally speaking the improvement is based upon end collars which serve the purposes both of holding the grid of the cage in operating position and also retaining the individual rollers from falling outwardly.

As illustrating this invention we have shown the preferred form by way of example on the accompanying drawings in which:

Fig. 1 is an axial section of the improved combined cage and retainer for roller bearings, taken on line 1—1 of Fig. 2;

Fig. 2 is an end view of the bearing;

Fig. 3 is a transverse section taken on line 3—3 of Fig. 1;

Fig. 4 is a similar section taken on line 4—4 of Fig. 1 and

Fig. 5 is a similar section taken on line 5—5 of Fig. 1.

Briefly stated the improved cage and retainer consists of a grid having bars for spacing the individual rollers and retaining them against dislodgment inward while collars are provided which hold the grid in position and at the same time confine the rollers against outward movement.

The drawings illustrate a series of bearing rollers 7. These are of the usual cylindrical form although the invention is equally applicable to conical rollers used in tapered bearings.

The rollers 7 are held in parallel spaced relationship by means of a spacing cage 8. This cage is made of sheet metal having end bars 9. The preferred form of construction is to construct the cage of flat sheet metal and then roll it into a cylindrical form in which the ends 10 and 11 of the end bars 9 abut as is illustrated in Fig. 3.

The grid is formed with parallel cross bars 13. Each cross bar 13 has an offset stepped shoulder 14 inwardly of the normal circumference of the bars 9.

The space between the cross bars 13 provides for holding the rollers 7 in normal running position as illustrated in Fig. 5. In such running position the rollers will contact an inner raceway or shaft and an outer raceway or bearing neither of which is illustrated. As shown in Fig. 5 the intermediate stepped shoulders 14 are substantially on the circular pitch line or chord between roller centers of the series of rollers.

The center section 15 of each cross bar 13 is dropped or further offset as shown in Figs. 1, 2 and 4. These center sections are of the same width as the stepped shoulders 14. It will be readily understood from Figs. 3 and 4 that this normal width of the sections 15 narrows the space in which the roller rests. The space is less than the diameter of the roller and as a consequence the roller is prevented from falling inwardly free from the cage. The cage therefore forms the inner retaining element of the bearing assembly.

The abutting ends 10, 11 of the grid are held in place by means of end retaining collars 16. These collars 16 have inner flanges 17, 17 around which the end grid bars 9 are received. An outer flange 18 surrounds the bars 9, 9. The collars 16 (Figs. 1 and 2) may therefore be said to be wrapped around or to enclose the end grid bars 9. They are held in place by a friction grip upon the bars 9, and are driven into tight position during assembly. They may also be fastened by welding or staking.

Each collar 16 has a series of offset projecting fingers 19, 19. These extend inwardly toward the center of the assembly and overlie the stepped shoulders 14 between the rollers as illustrated in Figs. 1 and 5.

As shown in Figs. 3, 4 and 5, the fingers 19 are of greater width than the cross bars 13. As a consequence they prevent the outward dislodgment of the roller 7 since adjacent fingers 19, 19 are spaced apart a distance less than the normal diameter of the intermediate roller 7.

It will be seen from Figs. 1 and 4 that the fingers do not extend over the offset central section 15.

The assembly of the circular spacing cage 8 within the end collars 16, 16 is first effected. The cross bars 13 have sufficient inherent resilience so that the mid-portions of two adjacent bars 13 will be spread apart sufficiently to receive the roller. The roller is prevented from falling out by the outer projecting fingers 19, 19. The cross bars 13 resume their normal position, and prevent inward dislodgment.

The limited extent of the fingers leaves the rollers generally free for contact with the outer raceway. This also permits the bearing to hold a greater quantity of lubricant.

The bearing assembly can be inserted as a unit in the bearing in which it is intended to be used without any danger of loss of the individual rollers.

As shown in Figs. 4 and 5, the shoulders 14 are designed to guide the rollers. They are therefore of sufficient length to maintain a good area for wear. This saves the middle sections 15 and the fingers 19 from premature wear. As a consequence their effectiveness in restraining the rollers from dropping inwardly or outwardly is unimpaired and the edge has a long life.

Furthermore, the shoulders 14 nearest the end bars have the maximum of rigidity so that they are best suited for guiding the rollers and maintaining them in parallel alignment.

The outer diameter of the fingers 19 have close clearance with the outer race or housing bore. In like manner the inner diameter of the middle sections 15 have only small clearance from the outer diameter of the inner race or shaft. Thus the retainer is maintained concentric in the bearing. However, the contact between the rollers and the grid is restricted to the shoulders 14. In other words the retainer is not a roll riding retainer. Hence, any wear occurring between the inner race or shaft and the portions 15, and between the outer race or housing and the fingers 19, will not impair the close hold that the retainer has on the rollers since these levels have not been subjected to wear against the raceways. In other words, the roller retaining portions of 15 and 19 are on opposite sides from surfaces which suffer wear and therefore the retaining of the rollers is unaffected by such wear.

The preferred form of the invention has been illustrated by way of example without, however, limiting it in respect to material, proportions, or minor details within the scope of the following claims.

What we claim is:

1. A combined cage and retainer for bearing rollers comprising a grid having opposite end bars substantially in the pitch line of the rollers, parallel cross bars having inwardly offset roller confining portions, and collars U-shaped in cross-section and having parallel inner and outer flanges enclosing the end bars, said outer flanges having outwardly offset fingers opposite the cross bars and being spaced apart less than the diameter of a roller.

2. A combined cage and retainer for bearing rollers comprising a grid having opposite end bars substantially in the pitch line of the rollers, parallel cross bars having inwardly stepped portions, the intermediate stepped portions engaging the rollers at their ends and the central stepped portions being normally out of contact with the rollers but confining them against inward movement, and collars enclosing the end bars, said collars being U-shaped in cross-section and having parallel outwardly offset fingers opposite the intermediate stepped portions of the bars and being spaced apart less than the diameter of a roller.

3. A combined cage and retainer for bearing rollers comprising a grid having opposite end bars substantially in the pitch line of the rollers, parallel cross bars having inwardly stepped portions of uniform width, the intermediate stepped portions engaging the rollers at their ends, and the central stepped portions being normally out of contact with the rollers but confining them against inward movement, and collars U-shaped in cross-section and having parallel inner and outer flanges enclosing the end bars, said outer flanges having outwardly offset fingers opposite the intermediate stepped portions of the bars and being spaced apart less than the diameter of a roller.

4. A combined cage and retainer for bearing rollers comprising a grid having opposite end bars substantially in the pitch line of the rollers, parallel cross bars having inwardly offset roller confining portions and collars U-shaped in cross-section and having parallel inner and outer flanges enclosing the end bars.

References Cited in the file of this patent

UNITED STATES PATENTS

| | | |
|---|---|---|
| 1,617,907 | Honold et al. | Feb. 15, 1927 |
| 1,764,198 | Carlson | June 17, 1930 |
| 2,202,792 | Gothberg | May 28, 1940 |
| 2,765,202 | Barr | Oct. 2, 1956 |

FOREIGN PATENTS

| | | |
|---|---|---|
| 461,151 | Germany | June 13, 1928 |
| 919,977 | Germany | Nov. 8, 1954 |
| 935,038 | Germany | Nov. 10, 1955 |